March 27, 1951 M. H. TUFT ET AL 2,546,324
TRIPPING MECHANISM FOR BALING PRESSES AND THE LIKE
Filed Sept. 17, 1945 2 Sheets-Sheet 2

WITNESS
CLIFFORD ZUDE

INVENTORS:
M. H. TUFT, + J. R. WEST
BY
ATTORNEYS.

Patented Mar. 27, 1951

2,546,324

UNITED STATES PATENT OFFICE 2,546,324

TRIPPING MECHANISM FOR BALING PRESSES AND THE LIKE

Miles H. Tuft, San Gabriel, Calif., and James Rex West, Ottumwa, Iowa, assignors to Deere Manufacturing Co., a corporation of Iowa Application September 17, 1945, Serial No. 616,802

14 Claims. (Cl. 100—20)

The present invention relates generally to baling presses and more particularly to baling presses of the type which travel through a field picking up crops, pressing the latter into bales, and automatically discharging the bales on the ground, and has for its principal object the provision of a novel and improved mechanism for automatically measuring the length of the bales and setting into operation the mechanism which ties each bale when it has attained the proper length.

In a hay press of this type, the tying mechanism is actuated by power transmitted through a self-interrupting clutch mechanism, which is tripped responsive to the control device which measures the length of the bales. This control device is usually in the form of a toothed wheel which engages the side of the bale being formed, and when the wheel has rotated a full revolution, it operates mechanism which trips the clutch device and initiates a tying operation. However, in view of the fact that the measuring wheel is moved only by supplying charges of hay or other crops to the compressing plunger which presses the charge into the bale, it is evident that if hay is not being fed to the baling chamber during the tying of a bale, the measuring wheel will not be moved after the knot is tied and therefore cannot be depended upon to move the tripping mechanism out of tripping position. Hence, without special tripping mechanism designed to eliminate this difficulty, the self-interrupting clutch device would continue to remain engaged after the knot had been tied and would therefore continue to operate the tying mechanism repeatedly, which would probably result in damage to the machine. It is therefore a more specific object of our invention to provide tripping mechanism for the clutch device which can be tripped only once in each revolution of the measuring wheel, thus insuring that the tying mechanism will go through the tying operation only once for each bale and will then be inoperative until another complete bale has been formed.

It is to be understood, however, that the tripping mechanism of our invention is not limited to the use in connection with a baling press, but can conceivably be used to trip a self-interrupting device which transmits power to any of various other types of mechanism.

Figure 1:
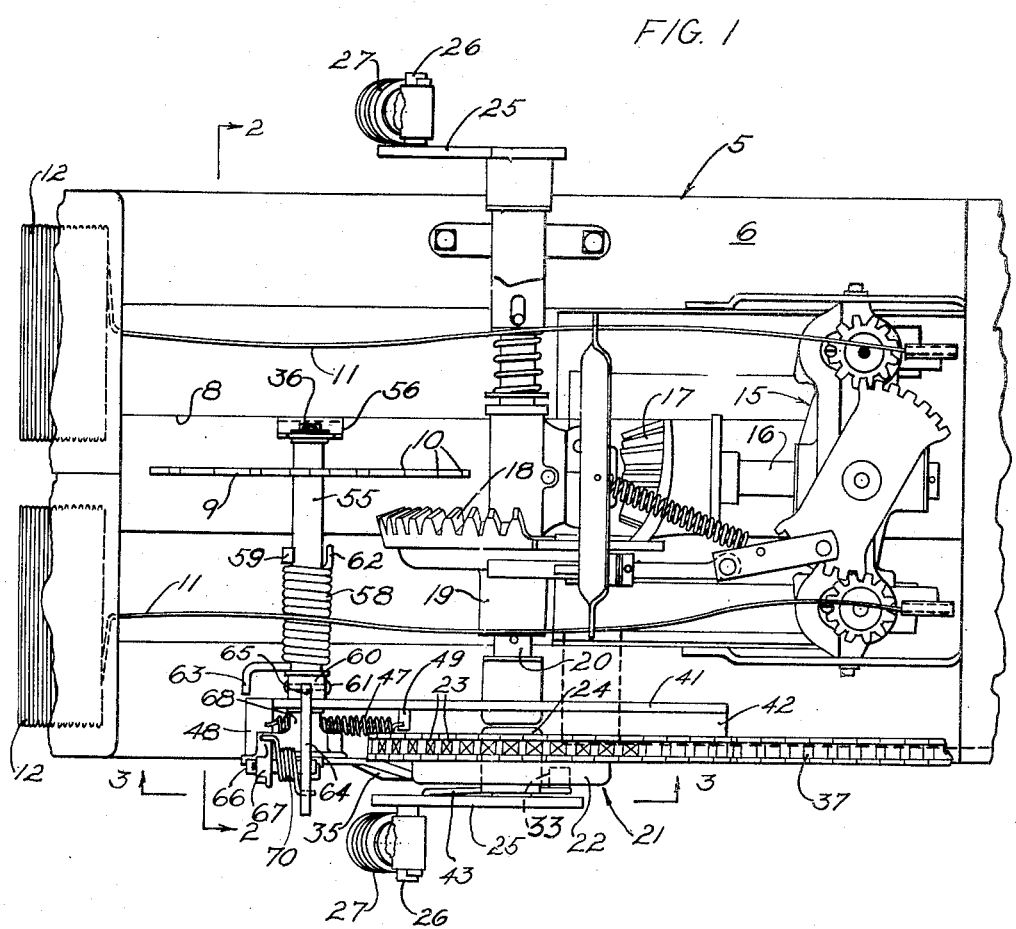
Figure 2:
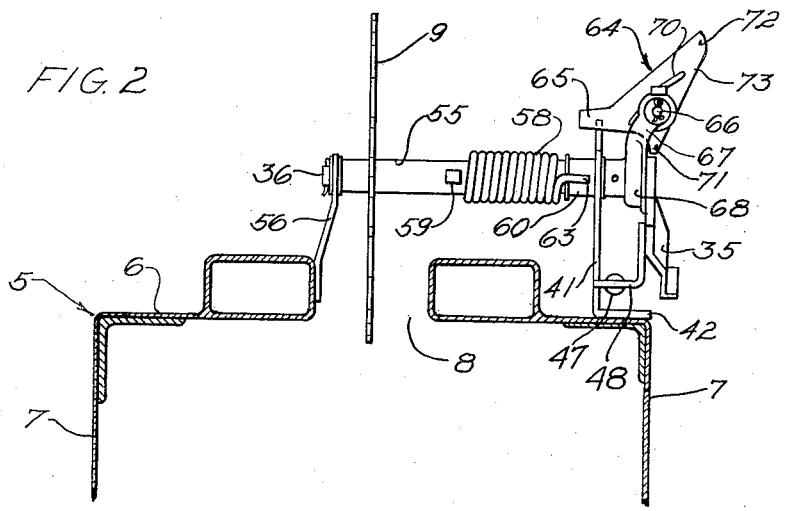
Figure 3:
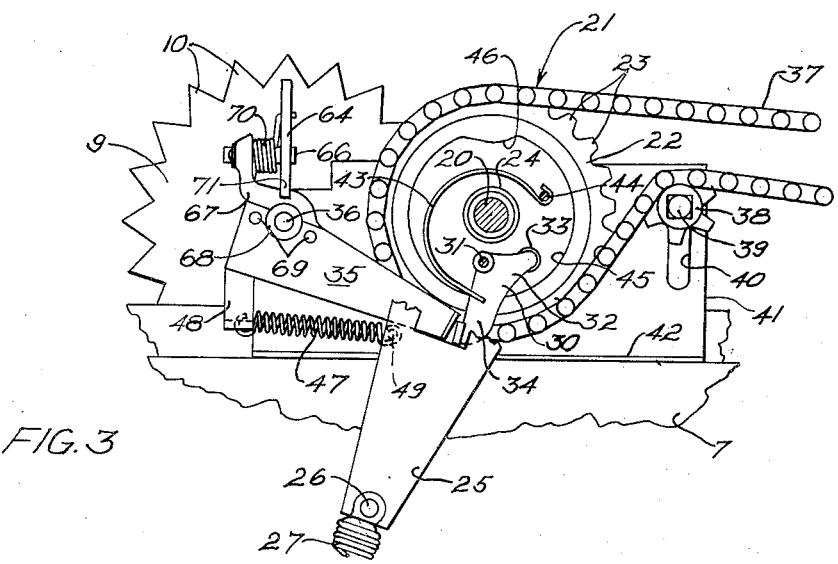

These and other objects and advantages of our invention will be apparent to those skilled in the art after a consideration of the following description and the drawings appended hereto, in which Figure 1 is a top plan view of a portion of a baling press, showing wire tying mechanism driven by power transmitted through a self-interrupting clutch device, which is provided with a tripping mechanism embodying the principles of our invention;

Figure 2 is a sectional elevational view taken along a line 2—2 in Figure 1; and Figure 3 is a front sectional view of the clutch device and tripping mechanism, taken along a line 3—3 in Figure 1.

The tripping mechanism disclosed herein is a part of a complete wire tying mechanism, shown and described in a co-pending application, Serial No. 594,684, filed May 19, 1945, by Miles H. Tuft, one of the present inventors, and issued on June 27, 1950, as Patent 2,512,754. Since the major portion of this wire tying mechanism is not an essential part of the present invention, it will not be described in detail herein.

Referring now to the drawings, the baling chamber is indicated in its entirety by reference numeral 5 and comprises top and side wall portions 6, 7, and a bottom (not shown) forming a baling chamber within which the hay or other crops is compressed into a bale. A longitudinally extending slot 8 is provided in the top wall 6, within which slot a measuring wheel 9 is positioned, having outwardly projecting teeth 10 which extend into the bale chamber and engage the top of the bale being formed therein. The circumference of the measuring wheel 9 determines the length of the bales to be formed in the press, for as the bales increase in length during their formation, they move toward the left, as viewed in Figure 1, under the measuring wheel 9, thereby turning the latter in a clockwise direction, as viewed in Figure 3. Each time the measuring wheel 9 turns one revolution, the bale is tied with a pair of laterally spaced baling wires 11 drawn from coils 12 carried on top of the bale case. The wires are tied by means of tying mechanism, indicated generally by reference numeral 15, which is also mounted on top of the bale case 5. The tying mechanism 15 is driven by a shaft 16, on which is mounted a beveled pinion 17, adapted to mesh with a bevel gear segment 18 having a hub 19 fixed to an actuating shaft 20, which is normally stationary during the formation of the bale, but which is turned through one complete revolution to actuate the bale tying mechanism.

The power for turning the shaft 20 through one revolution to actuate the tying mechanism is transmitted through a one revolution, self-interrupting clutch device 21, comprising a continuously rotating element 22, having sprocket teeth 23 around the circumference thereof, and carried on a hub 24 journaled on the shaft 20. The normally stationary element of the clutch mechanism comprises the shaft 20 and a pair of arms 25 rigidly mounted at opposite ends of the shaft 20, respectively. Each of the arms 25 is provided with a crank pin 26, to which spring links 27 are connected, for swinging the needles (not shown) of the wire tying apparatus. One of the arms 25 lies over the open side of the normally rotating member 22. A clutch dog 30 is pivotally mounted on a pin 31 attached to the inner side of the arm 25, and is in the form of a bell crank, one arm 32 of which carries a roller 33. The other arm 34 of the clutch dog 30 extends outwardly beyond the normally rotating member 22 and engages a trip arm 35, which is mounted on a shaft 36, the latter being rockably supported for movement about an axis parallel to the shaft 20 and spaced therefrom.

Normally, the clutch member 22 is driven at a constant speed and in a clockwise direction by a drive chain 37, which is trained around the sprocket teeth 23 and extends to a suitable drive sprocket (not shown), which is driven by the shaft which drives the plunger of the baling press. An idler sprocket 38 is journaled on a bolt 39, which is secured in vertically adjusted position in a slot 40 in a plate 41 having a horizontal flange 42 secured to the top 6 of the bale case 5. The idler 38 can be shifted vertically to adjust the slack in the drive chain 37. When the trip arm 35 is swung downwardly in a clockwise direction to disengage the arm 34 of the dog 30, the latter is turned in a clockwise direction about the mounting pin 31 by means of a spring 43 that is anchored to a pin 44 attached to the arm 25. The spring 43 shifts the roller 33 into engagement with an internal cylindrical track 45 inside the clutch member 22. This track 45 has a hump or raised portion 46 against which the roller 33 engages when it is rolling on the track 45. The rotating member 22 then drives the arm 25 in a complete revolution, by force exerted through the hump 46, the roller 33, the dog 30, and the pin 31, thus actuating the wire tying mechanism as mentioned above. During the rotation of the arm 25 and shaft 20, the trip arm 35 is returned to its original position by means of a spring 47 connected between a lug 48 fixed to the arm 35 and a bolt 49 secured to the plate 41. The trip arm 35 thus bears upon the outer surface of the rotating clutch member 22 and is engaged in this position by the arm 34 of the trip dog 30, thereby rocking the latter to disengage the roller 33 from the hump 46.

The shaft 36 extends through a sleeve 55, which is rotatable thereon, and the end of the shaft 36 is journaled in a bearing 56 in the form of an apertured plate secured to the top of the bale case. The opposite end of the shaft 36 is journaled within an aperture in the vertical plate 41. The sleeve 55 carries the serrated measuring wheel 9, which projects through the slot 8 in the top wall 6 of the bale case, with the teeth of the wheel 9 in engagement with the bale being formed. A helical spring 58 is coiled about the wheel supporting sleeve 55 between a lug 59 welded to the sleeve 55 and a collar 60 fixed to the shaft 36 by a pin 61. The collar 60 also serves as a thrust bearing at one end of the sleeve 55, the plate 56 acting against the opposite end of the sleeve. The end of the spring 58 nearest the wheel 9 is bent in an axial direction, as indicated at 62, in register with the lug 59. During baling the lug 59 rotates into engagement with the end 62 of the spring. The opposite end of the spring is extended tangentially outwardly and has an outer end 63 bent axially and is adapted to engage a trigger member 64, which is in the form of a bell crank having an inner arm 65 extending horizontally in a position in which it will be engaged by the outer end 63 of the spring 58. The trigger member 64 is secured to a supporting pin 66, which is journaled in an arm 67 of a casting which also has a hub 68 mounted on the shaft 36. The trip arm 35 is secured to the casting hub 68 by bolts 69. The trigger member 64 is urged in a clockwise direction, as viewed in Figure 2, by means of a coil spring 70, which acts in torsion between the casting arm 67 and the trigger member 64 and the latter is provided with a downwardly extending abutment 71, which engages the casting arm 67 to prevent any further movement in a clockwise direction from the position shown in Figure 2. The trigger 64 can, however, be rotated in a counterclockwise direction, in order to tilt the arm 65 downwardly out of engagement with the end 63 of the spring 58. The trigger member 64 has an upwardly extending arm 72, the lower edge 73 of which is inclined upwardly and outwardly overhanging the side wall 7 of the bale case 5, in the path of rotary swinging movement of the needle actuating arm 25.

During the baling operation, the bales move toward the left, as viewed in Figure 1, gradually rotating the measuring wheel 9 in a clockwise direction, as viewed in Figure 3, thereby rotating the sleeve 55 relative to the shaft 36. By the time the wheel 9 has made nearly a complete revolution, the lug 59 on the sleeve 55 moves into engagement with one end 62 of the spring 58, while the other end 63 of the spring 58 moves into engagement with the arm 65 of the trigger member 64. Further rotation of the wheel 9 and sleeve 55 exerts a force through the lug 59, stressing the spring 58 in torsion between the lug 59 and the arm 65 and exerting a force against the trigger member 64 which tends to swing the arm 35 and shaft 36 in a clockwise direction, as viewed in Figure 3, but this is resisted by the spring 47, which tends to hold the arm 35 in its holding position in engagement with the clutch dog arm 34. Movement of the wheel 9, however, builds up a torsional stress in the spring 58, which finally overcomes the tension spring 47, causing the trigger member 64, shaft 36, and arm 35 to swing in a clockwise direction, thereby disengaging the arm 35 from the clutch dog arm 34. The spring 43 then shifts the clutch dog 30 to bring the roller 33 into contact with the inner track 45 on the constantly rotating member 22 of the clutch, and when the hump 46 engages the roller 33, the shaft 20 and arm 25 begin to rotate in a clockwise direction. The arm 25 swings upwardly, engaging the inclined surface 73 of the trigger arm 72, forcing the latter in a counterclockwise direction, as viewed in Figure 2. This swings the spring engaging arm 65 downwardly, disconnecting it from the end 63 of the spring 58, thereby causing the latter to contract and snap past the engaging arm 65. The coil spring 70 immediately restores the trigger member 64 to its original position, with the stop arm 71 bearing against the casting arm 67, and the spring 47 returns the trip arm 35 into sliding engagement with the outside of the clutch housing 22, where it is in a position to engage the arm 34 of the clutch dog 30 after the clutch has made a complete revolution, thereby disconnecting the roller 33 from the hump 46 on the constantly rotating member 22.

Inasmuch as the end 63 of the spring 58 is sprung past the arm 65 on the trigger member 64, a complete revolution of the wheel 9 must be made before the end 63 of the spring can be brought around into engagement once more with the arm 65 of the trigger member. This insures that the tying mechanism will actuate only once, regardless of whether the measuring wheel 9 has any movement or not during the rotation of the self-interrupting clutch 21 and shaft 20.

We claim:

1. In combination, a driven shaft, a self-interrupting clutch device for driving said shaft, a clutch trip arm disposed adjacent said clutch device and shiftable out of a normal position to initiate an operation of said clutch device, and means for controlling the shifting of said arm comprising a trigger member shiftably mounted on said trip arm, a control element, and resilient means engageable between said element and said trigger member to shift said arm out of said normal position, said shaft having a part movable therewith into engagement with said trigger member to disengage the latter from said resilient means to release said arm to permit the latter to return to said normal position.

2. In combination, a driven shaft, a self-interrupting clutch device for driving said shaft, a clutch trip arm disposed adjacent said clutch device and shiftable out of a normal position to initiate an operation of said clutch device, said arm being biased to return to said normal position when the arm is released, to interrupt the movement of said device after a predetermined extent of movement, and means for controlling the shifting of said arm comprising a trigger member shiftably mounted on said trip arm and movable relative thereto out of a normal position, a control element, and resilient means engageable between said element and said trigger member to shift said trip arm out of its normal position, said shaft having a part movable therewith into engagement with said trigger member to disengage the latter from said resilient means to release said arm to permit the latter to be returned to said normal position to stop said clutch device, said trigger member also being biased to return to its normal position after being disengaged from said resilient means.

3. In combination, a driven shaft, a self-interrupting clutch device for driving said shaft, a clutch trip arm pivotally mounted adjacent said device and swingable out of a clutch disabling position to initiate an operation of said device, and means for controlling said trip arm comprising a trigger member pivotally mounted on said trip arm for swinging movement relative thereto about an axis disposed transversely of the pivot axis of said trip arm, a control element, and a spring engageable between said element and said trigger member to swing said trip arm, thereby initiating an operation of said clutch device, said shaft having a part movable therewith into engagement with said trigger member to swing the latter out of engagement with said spring, thereby releasing said trip arm for return to clutch disabling position.

4. In combination, a driven shaft, a self-interrupting clutch device for driving said shaft, a clutch trip arm disposed adjacent said clutch device and shiftable out of a normal position to initiate an operation of said clutch device, and means for controlling the shifting of said trip arm comprising a trigger member shiftably mounted on said trip arm, a control element including a rotatable shaft, and a spring coiled around said control shaft and having one end engaged with the latter, the other end of said spring being engageable with said trigger member for shifting said trip arm out of said normal position by rotation of said control shaft, said driven shaft having a part movable therewith for disengaging said trigger member from said spring to release said trip arm for return to normal position.

5. In combination, a driven shaft, a self-interrupting clutch device for driving said shaft, a clutch trip arm pivotally mounted adjacent said device and swingable out of a normal clutch disabling position to initiate an operation of said device, and means for controlling said trip arm comprising a trigger member pivotally mounted on said trip arm for swinging movement relative thereto about an axis disposed transversely of the pivot axis of said trip arm, a control element including a rotatable shaft, and a spring coiled around said control shaft and having one end engaged with the latter, the other end of said spring being engageable with said trigger member for shifting said trip arm out of said normal position by rotation of said control shaft, said driven shaft having a part movable therewith for disengaging said trigger member from said spring to release said trip arm for return to normal position.

6. In a baling press, the combination of a normally stationary actuating shaft for tying mechanism, a self-interrupting clutch device for driving said shaft, a clutch trip arm disposed adjacent said clutch device and shiftable out of a normal position to initiate an operation of said clutch device, and means for controlling the shifting of said arm comprising a trigger member shiftably mounted on said trip arm, a measuring wheel engaging the bales being formed, and resilient means engageable between said wheel and said trigger member to shift said arm out of said normal position, said shaft having a part movable therewith into engagement with said trigger member to disengage the latter from said resilient means to release said arm to permit the latter to return to said normal position.

7. In a baling press, the combination of a normally stationary actuating shaft for tying mechanism, a self-interrupting clutch device for driving said shaft, a clutch trip arm disposed adjacent said clutch device and shiftable out of a normal position to initiate an operation of said clutch device, and means for controlling the shifting of said arm comprising a trigger member shiftably mounted on said trip arm, a measuring wheel engaging the bales being formed, a rotatable shaft on which said wheel is mounted, and a spring coiled around said wheel shaft and having one end engaged with the latter, the other end of said spring being engageable with said trigger member for shifting said trip arm out of said normal position by rotation of said wheel shaft, said driven shaft having a part movable therewith for disengaging said trigger member from said spring to release said trip arm for return to normal position.

8. In a baling press, the combination of a normally stationary actuating shaft for tying mechanism, a self-interrupting clutch device for driving said shaft, a clutch trip arm pivotally mounted adjacent said device and swingable out of a normal clutch disabling position to initiate an operation of said device, and means for controlling said trip arm comprising a trigger member pivotally mounted on said trip arm for swinging movement relative thereto about an axis disposed transversely of the pivot axis of said trip arm, a measuring wheel engaging the bales being formed, and resilient means engageable between said wheel and said trigger member to shift said trip arm out of said normal position, said shaft having a part movable therewith into engagement with said trigger member to disengage the latter from said resilient means to release said trip arm to permit the latter to return to said normal position.

9. In a baling press, the combination of a normally stationary actuating shaft for tying mechanism, a self-interrupting clutch device for driving said shaft, a clutch trip arm pivotally mounted adjacent said device and swingable out of a normal clutch disabling position to initiate an operation of said device, and means for controlling said trip arm comprising a trigger member pivotally mounted on said trip arm for swinging movement relative thereto about an axis disposed transversely of the pivot axis of said trip arm, a measuring wheel engaging the bales being formed, a rotatable shaft on which said wheel is mounted, and a spring coiled around said wheel shaft and having one end engaged with the latter, the other end of said spring being engageable with said trigger member for shifting said trip arm out of said normal position by rotation of said wheel shaft, said driven shaft having a part movable therewith for disengaging said trigger member from said spring to release said trip arm for return to normal position.

10. In a baling press, the combination of a normally stationary actuating shaft for tying mechanism, a self-interrupting clutch device for driving said shaft, a clutch trip arm pivotally mounted adjacent said device and swingable out of a normal clutch disabling position to initiate an operation of said device, said arm being biased to return to said normal position when the arm is released, to interrupt the movement of said device after a predetermined extent of movement, and means for controlling the shifting of said arm comprising a trigger member pivotally mounted on said trip arm for swinging movement relative thereto about an axis disposed transversely of the pivot axis of said trip arm, a measuring wheel engaging the bales being formed, a rotatable shaft on which said wheel is mounted, and a spring coiled around said wheel shaft and having one end engaged with the latter, the other end of said spring being engageable with said trigger member for shifting said trip arm out of said normal position by rotation of said wheel shaft, said driven shaft having a part movable therewith for disengaging said trigger member from said spring to release said trip arm for return to normal position, said trigger member also being biased to return to its normal position after being disengaged from said spring.

11. In a baling press, the combination of a normally stationary actuating shaft for tying mechanism, a self-interrupting clutch device for driving said shaft, a clutch trip arm pivotally mounted adjacent said device and swingable out of a clutch disabling position to initiate an operation of said device, a control shaft disposed coaxially with said trip arm and rotatable relative thereto, a measuring wheel fixed to said control shaft and engaging the bales being formed, and means responsive to a revolution of said control shaft by said measuring wheel for swinging said trip arm comprising a spring coiled around said control shaft and having one end engaging the latter, and a trigger member pivotally mounted on said trip arm and positioned to engage the other end of said spring, said actuating shaft having a part movable therewith and engageable with said trigger member to swing the latter out of engagement with said spring to release said trip arm for return to clutch disabling position.

12. In a baling press, the combination of a normally stationary actuating shaft for tying mechanism, a self-interrupting clutch device for driving said shaft, a clutch trip arm pivotally mounted adjacent said device and swingable out of a normal clutch disabling position to initiate an operation of said device, said arm being biased to return to said normal position when the arm is released, to interrupt the movement of said device after a predetermined extent of movement, and means for controlling the shifting of said arm comprising a control shaft disposed coaxially with said trip arm and rotatable relative thereto, a measuring wheel fixed to said control shaft and engaging the bales being formed, and means responsive to a revolution of said control shaft by said measuring wheel for swinging said trip arm comprising a spring coiled around said control shaft and having one end engaging the latter, and a trigger member pivotally mounted on said trip arm and positioned to engage the other end of said spring, said actuating shaft having a part movable therewith and engageable with said trigger member to swing the latter out of engagement with said spring to release said trip arm for return to clutch disabling position, said trigger member also being biased to return to its normal position after being disengaged from said spring.

13. In combination with a pair of driving and driven parts and means for connecting said parts together, a trip arm shiftably mounted adjacent said parts and adapted to secure said means in an inoperative position for disconnecting said parts, a rotatable control shaft, and means for disengageably connecting said shaft with said trip arm for shifting the latter, said last mentioned connecting means including a resilient member and a trigger member, one of said members being rotatable with said shaft and the other being mounted on said trip arm, said members being engageable during rotation of said shaft to transmit force therebetween, and means connected with said driven part and moveable therewith into engagement with said trigger member to disengage said members and release said trip arm.

14. In combination with a pair of driving and driven parts and means for connecting said parts together, a trip arm shiftably mounted adjacent said parts and biased to a normal position to secure said means in an inoperative position for disconnecting said parts, a control shaft rotatable relative to the trip arm, and means for disengageably connecting said shaft with said trip arm for shifting the latter out of its normal position, said last mentioned connecting means including a yielding member and a trigger member, one connected to the shaft and the other to the trip arm and engageable with each other, said yielding member being constructed and arranged to be loaded by initial rotation of the shaft relative to the trip arm until such loading thereof overcomes the bias on the trip arm so as to transmit increasing force between said shaft and trip arm and to delay shifting of the trip arm, and means connected with said driven part for disengaging said members to release said trip arm.

MILES H. TUFT.
JAMES REX WEST.

REFERENCES CITED

The following references are of record in the file of this patent:

UNITED STATES PATENTS

| Number | Name | Date |
| --- | --- | --- |
| 1,765,527 | Gollnick et al. | June 24, 1930 |
| 2,182,021 | Gookin | Dec. 5, 1939 |
| 2,405,688 | Crumb | Aug. 13, 1946 |

FOREIGN PATENTS

| Number | Country | Date |
| --- | --- | --- |
| 594,733 | Germany | Mar. 21, 1934 |